(12) United States Patent
Robert, Jr.

(10) Patent No.: US 9,435,466 B2
(45) Date of Patent: Sep. 6, 2016

(54) CORROSION REDUCING MINIMUM CONTACT CLAMP FOR SUPPORTING AND SECURING TUBING

(71) Applicant: Atmar Keith Robert, Jr., Houston, TX (US)

(72) Inventor: Atmar Keith Robert, Jr., Houston, TX (US)

(*) Notice: Subject to any disclaimer, the term of this patent is extended or adjusted under 35 U.S.C. 154(b) by 0 days.

(21) Appl. No.: 14/261,928

(22) Filed: Apr. 25, 2014

(65) Prior Publication Data

US 2014/0319290 A1    Oct. 30, 2014

Related U.S. Application Data

(60) Provisional application No. 61/815,899, filed on Apr. 25, 2013.

(51) Int. Cl.
*F16L 3/223* (2006.01)

(52) U.S. Cl.
CPC .............. *F16L 3/2235* (2013.01); *F16L 3/223* (2013.01)

(58) Field of Classification Search
CPC ..... F16L 3/1091; F16L 3/2235; F16L 3/223; F16L 3/227; F16L 3/23; F16L 3/237; F16L 3/26; F16L 3/00
USPC ............ 248/68.1, 49, 65, 73, 74.4, 74.1, 62; 601/117–121
See application file for complete search history.

(56) References Cited

U.S. PATENT DOCUMENTS

| | | | |
|---|---|---|---|
| 2,546,095 A * | 3/1951 | Gustlin | 601/121 |
| 3,037,500 A * | 6/1962 | Daugherty | 601/121 |
| 4,378,007 A * | 3/1983 | Kachadourian | 601/121 |
| 4,395,009 A | 7/1983 | Bormke | |
| 4,807,603 A * | 2/1989 | Yasui | 601/121 |
| 4,971,271 A * | 11/1990 | Sularz | 248/68.1 |
| 5,131,383 A * | 7/1992 | Juarez | 601/19 |
| 5,143,056 A * | 9/1992 | Yih-Jong | 601/118 |
| 5,542,339 A | 8/1996 | Kaczmarczyk et al. | |

(Continued)

FOREIGN PATENT DOCUMENTS

EP    1 373 773 B1    7/2006

OTHER PUBLICATIONS

International Search Report and Written Opinion of the International Searching Authority, mailed Sep. 5, 2014, in International application No. PCT/US2014/035449.

(Continued)

*Primary Examiner* — Nkeisha Smith
(74) *Attorney, Agent, or Firm* — Mattingly & Malur, PC

(57) ABSTRACT

Tubing clamps having a minimum contact area between the tubes and the clamps supporting surfaces are provided for minimizing the collection and retaining of liquids at the supporting surfaces. A predetermined minimum spacing is maintained between the tubes supported by the tubing clamps while maintaining sufficient ventilation between the tubes and the clamps to permit drying of any liquids which contact the tubes and the clamps at the support points. This prevents electrolysis and corrosion caused by liquid retention and contact of dissimilar metals. Further, the tubing clamps are readily adapted to secure tubes of different outer diameters in a single row or multiple rows, such as in a stacked configuration. The clamps are provided with upper and lower supports, each having matching grooves that have chamfered edges forming the upper and lower tubing contact surfaces. The supports are secured together with fasteners to clamp the tubing therebetween.

6 Claims, 4 Drawing Sheets

(56) References Cited

U.S. PATENT DOCUMENTS

| | | | |
|---|---|---|---|
| 5,709,705 A * | 1/1998 | Belcher | 606/204.35 |
| 6,019,792 A * | 2/2000 | Cauthen | 623/17.14 |
| 6,129,687 A * | 10/2000 | Powell et al. | 601/15 |
| 6,308,921 B1 | 10/2001 | Borzucki | |
| 6,783,101 B2 | 8/2004 | Knotts | |
| 7,500,644 B2 * | 3/2009 | Naudet et al. | 248/68.1 |
| 7,530,536 B2 | 5/2009 | Hashimoto | |
| 7,806,387 B2 * | 10/2010 | Wenger et al. | 254/389 |
| 8,028,378 B2 * | 10/2011 | Shor et al. | 24/19 |
| 8,287,598 B1 * | 10/2012 | Doty | 623/17.16 |
| 2009/0057498 A1 * | 3/2009 | Oh et al. | 248/68.1 |
| 2010/0260573 A1 * | 10/2010 | Gardner et al. | 411/81 |
| 2011/0309314 A1 * | 12/2011 | Thomas | 254/134.3 R |
| 2012/0175473 A1 * | 7/2012 | Fraze | 248/74.1 |
| 2013/0184620 A1 * | 7/2013 | Cohen | 601/118 |
| 2014/0312182 A1 * | 10/2014 | Nijdam et al. | 248/49 |
| 2014/0346291 A1 * | 11/2014 | Booth | 248/74.4 |

OTHER PUBLICATIONS

International Preliminary Report on Patentability received in corresponding International Application No. PCT/US14/35449 dated Apr. 17, 2015.

* cited by examiner

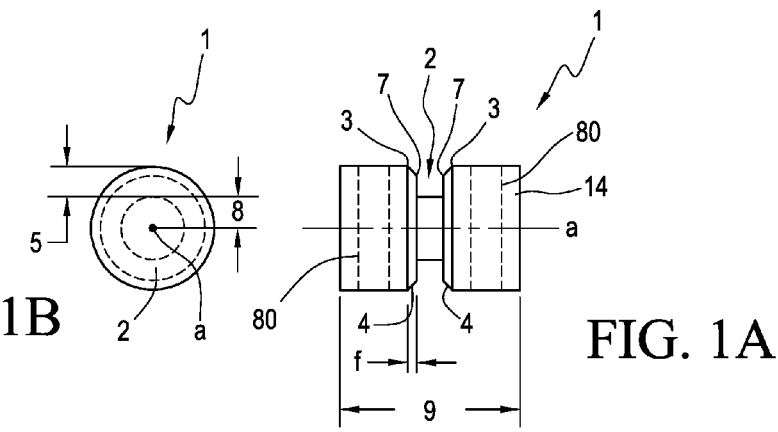
FIG. 1B  FIG. 1A
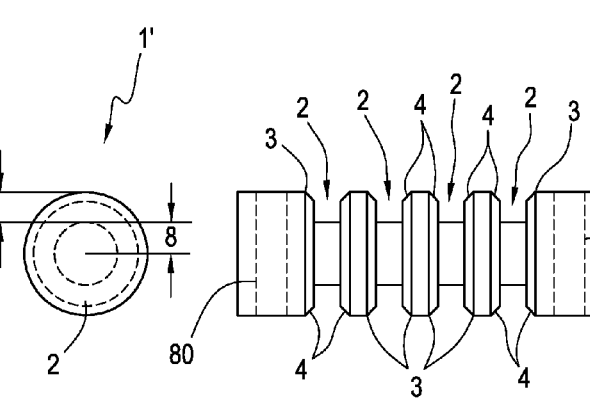
FIG. 1D  FIG. 1C
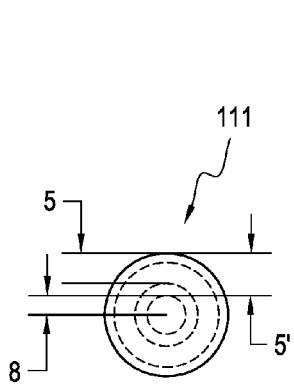 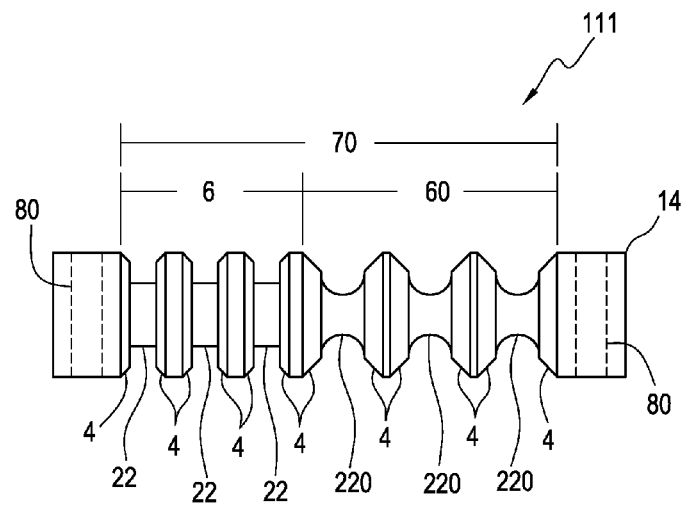
FIG. 1F  FIG. 1E

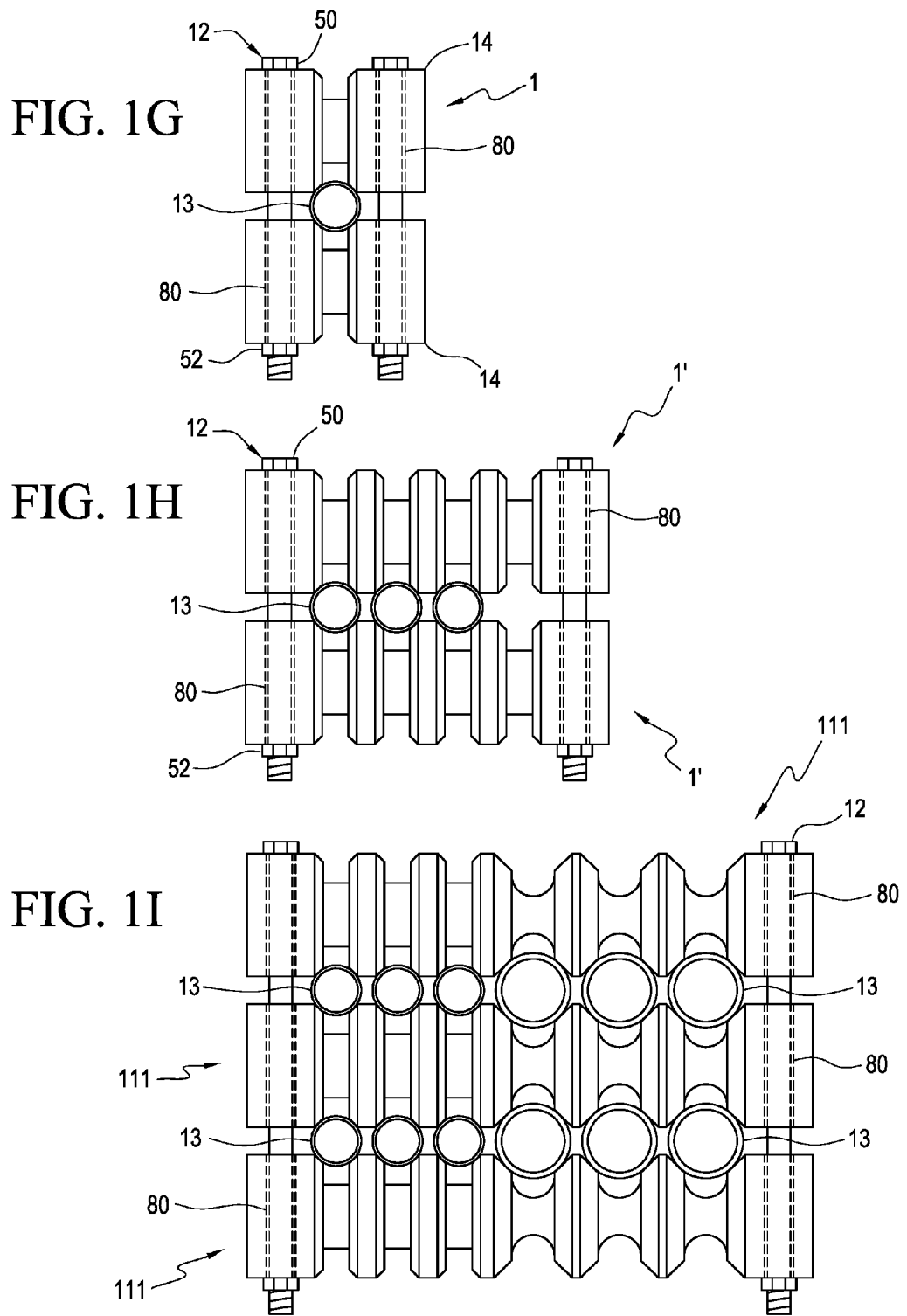

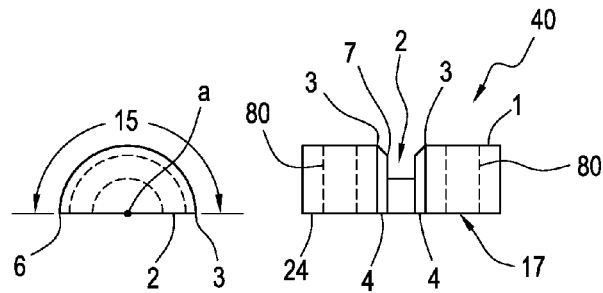
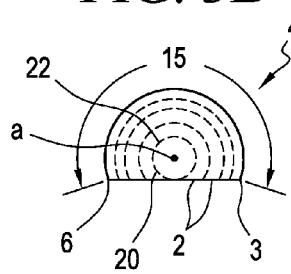
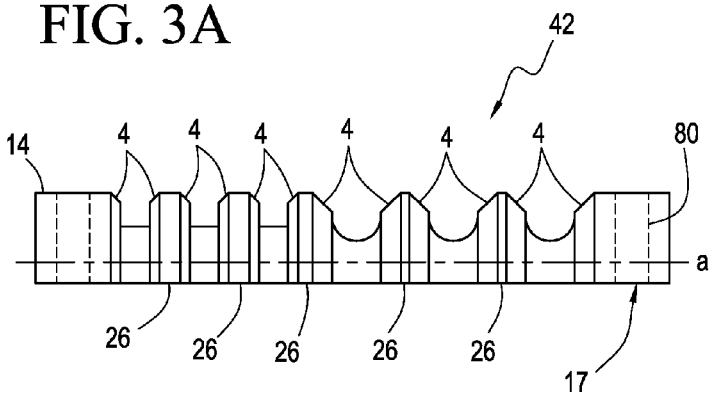
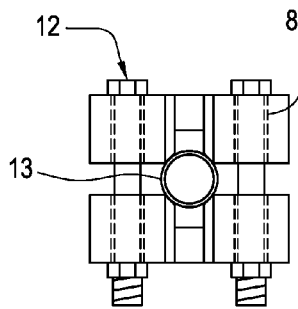
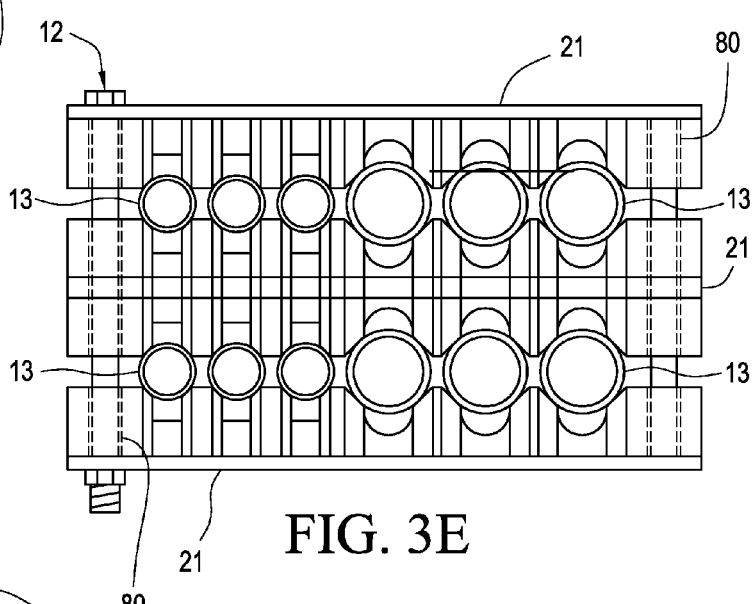
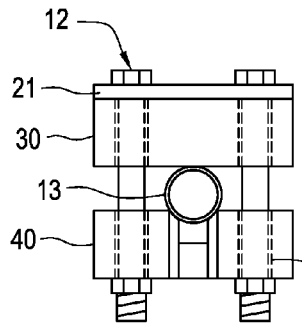
FIG. 3B  FIG. 3A
FIG. 3D  FIG. 3C
FIG. 3F
FIG. 3G  FIG. 3E

CORROSION REDUCING MINIMUM CONTACT CLAMP FOR SUPPORTING AND SECURING TUBING

FIELD OF THE INVENTION

The invention relates to the clamping and supporting of tubing used to transport fluids, chemicals, oils and gases in industries, such as oil and gas drilling; and production and refining, where tubing is commonly used. Other industries using tubing include shipping, military installations and equipment, food production installations, manufacturing sites, etc. In addition, the invention is applicable in corrosive environments, such as marine environments, where minimum contact between tubing and the clamps that support the tubing is preferable in order to reduce the accumulation of moisture contacting the tubing at the support area, which contact creates a risk of pitting and corrosion of the tubing.

DESCRIPTION OF RELATED ART

Clamping systems of the prior art include solutions for solving or reducing the problems associated with electrolysis and corrosion of tubing. However, the greater the contact area between the clamping supports and the tubing, the more the contact area is likely to collect and hold moisture. Vibration isolating and insulating materials are conventionally provided between the contact surfaces of the clamp supports and the tubing. However, such additional insulating materials hold moisture. Further, spacers, such as metallic spacers, are used with conventional clamping systems to space apart a series of tubes in a row. However, all such features constitute additional parts in the manufacture and assembly of the clamps. Accordingly, such designs are disadvantageous with respect to the economical and efficient implementation of such clamps in clamping systems for tubing of various types of materials and sizes typically found in industrial installations existing in potentially corrosive environments.

BRIEF SUMMARY OF THE INVENTION

It is an object of the present invention to provide a clamp or an arrangement of clamps in a clamping system that provides minimum contact between the tubing support surfaces and the tubing to allow for ventilation that minimizes electrolysis and corrosion of the tubing while offering a compact clamping system permitting uniform configurations of a variety of tubes with equal or different diameters.

The clamping supports enable a number of tubes to be secured and supported within the same clamping system using one or more grooves of equal or unequal size (when supporting multiple tubes of the same OD) formed in the clamp support bodies in order to enable the tubes to seat properly with tubing engaging surfaces that are of a minimum contact area.

Embodiments of the present invention provide a corrosion reducing minimum contact clamp comprised of cylindrically shaped bodies made from a metallic, composite or plastic material for forming upper and lower clamping support bodies for securing an individual row of tubes or a rectangular array of tubes, including one or more spaced-apart tubing accommodating grooves of a shape having spaced groove inner and outer edges that form conical frustums. The grooves can be of equal or unequal size within the same clamp support bodies in order to enable tubes of different sizes or multiple tubes of the same size to be accommodated and properly seated side by side within the same tubing clamp.

BRIEF DESCRIPTION OF THE DRAWINGS

FIG. 1A illustrates a side view of a cylindrical clamp support body according to an embodiment of the invention having one groove with spaced inner and outer edges that define chamfered contact areas with the tubing to be supported.

FIG. 1B illustrates an end view of the cylindrical clamp support body according to FIG. 1A.

FIG. 1C illustrates a side view of a cylindrical clamp support body according to an embodiment of the invention having multiple grooves of the same dimensions with spaced inner and outer edges that form chamfered contact areas supporting tubing of substantially the same outer diameters.

FIG. 1D illustrates an end view of the cylindrical clamp support body according to FIG. 1C.

FIG. 1E illustrates a side view of a cylindrical clamp support body according to an embodiment of the invention having multiple grooves of different dimensions with spaced inner and outer edges that form chamfered contact areas supporting tubing of respectively different outer diameters.

FIG. 1F illustrates an end view of the cylindrical clamp support body according to FIG. 1E.

FIG. 1G illustrates a side view of a clamp comprised of upper and lower clamp support bodies according to the embodiment of FIG. 1A having a tube clamped between them and supported by the groove with chamfered surfaces.

FIG. 1H illustrates a side view of a clamp comprised of upper and lower clamp support bodies according to the embodiment of FIG. 10 having tubes clamped between them and supported by the grooves with chamfered surfaces.

FIG. 1I illustrates a side view of a clamp comprised of upper and lower clamp support bodies according to the embodiment of FIG. 1E having tubes of respectively different diameters clamped between them and supported by the grooves with chamfered surfaces.

FIG. 3A illustrates a side view of a cylindrical clamp support body according to another embodiment of the invention having one groove with chamfered surfaces that form contact areas with the tubing to be supported.

FIG. 3B illustrates an end view of the cylindrical clamp support body according to FIG. 3A.

FIG. 3C illustrates a side view of a cylindrical clamp support body according to another embodiment of the invention having multiple grooves of different dimensions with chamfered surfaces that form contact areas supporting tubing of respectively different outer diameters.

FIG. 3D illustrates an end view of the cylindrical clamp support body according to FIG. 3C.

FIG. 3E illustrates a side view of a clamp comprised of upper and lower clamp support bodies according to the embodiment of FIG. 3C and a middle clamp support body of FIG. 1E respectively supporting rows of tubes with mixed outer diameters clamped between the clamp support bodies and supported by the respective grooves with chamfered surfaces, secured by fasteners as part of a clamping assembly or system.

FIG. 3F illustrates a side view of a clamp comprised of upper and lower clamp support bodies according to the embodiment of FIG. 3A supporting a tube clamped between the clamp support bodies and supported by the respective grooves with chamfered surfaces and secured by fasteners.

FIG. 3G illustrates a side view of a clamp according to another embodiment of the invention comprised of an upper clamp support body without any grooves and a lower clamp support body of the embodiment of FIG. 3A having grooves supporting a tube clamped between the upper and lower clamp support bodies, and secured by fasteners.

DESCRIPTION OF THE PREFERRED EMBODIMENT

Figure 2A:
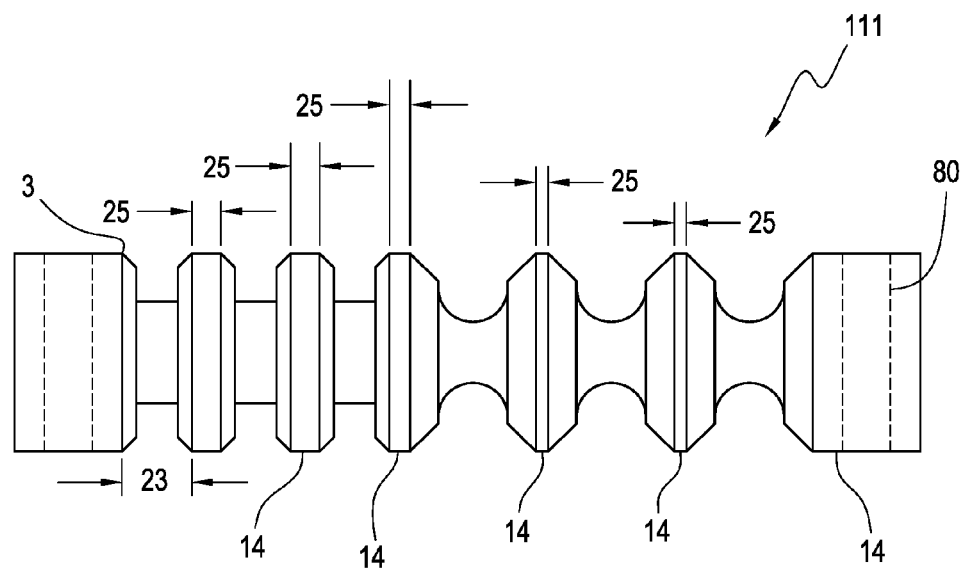
FIGS. 2A and 2B are detailed views of the cylindrical clamp support body according to the embodiment of the invention shown in FIG. 1E showing the base, chamfer angles and depth of grooves of the clamp body.

In FIG. 1, FIG. 1A shows a clamp support body of right circular cylindrical shape 1 having a single circular groove 2 with features of a wedge and having groove outer edges 3 and groove inner edges 7 which are spaced apart from each other at a radial outer portion of the groove. Each pair of spaced outer and inner groove edges 3; 7 cooperate to form one of two mirrored right conical frustums 4 each such conical frustum 4 having a frustum width "f". The right conical frustums 4 each formed by the groove edges 3; 7 on one of the two sides of the groove 2 each form a wedge and are the contact surfaces for tubing, when clamped. The wedge shape prevents the tubing from shifting to either side. The conical frustums 4, each formed by one pair of the groove edges 3; 7 are each a truncated conical surface that comes in contact with the tubing which is typically of circular shape, resulting in a minimal contact area of the clamp and tubing. A groove depth 5 of groove 2 provides a space between a base surface 22 of the groove 2 and the tubing. This space is required to allow ventilation for drying any liquids that might be present or accumulate as a result of the installation environment. In one embodiment of the present invention, a distance 8 from a longitudinal axis of symmetry "a" of the clamp support body, to the base 22 of the groove 2, which groove 2 itself has the depth 5, as shown in FIG. 1B, is not less than 0.125 inch. Overall the length 9 of the clamp support body is not less than 1.25 inches, for example. The outer edge 3 of the right conical frustum 4 is shown having a circumference which is equal to that of the surface of greatest circumference 14 of the clamp and is the outer edge 3 of the groove 2. In the following description, a tube is used as an exemplary application. However, the present invention may be used with any cylindrical type body, such as a pipe and the like.

FIGS. 1C and 1D show a clamp of right circular cylindrical shape 1' that is consistent with the features of the clamp 1 shown in FIG. 1A, except for having multiple spaced-apart grooves 2 for clamping and supporting more than one tube of equal diameter.

FIGS. 1E and 1F show a clamp of right circular cylindrical shape 111 having multiple circular grooves 2 of identical size and dimension in each of a first series of grooves 6 and a second series of grooves 60, which form a multiple series 70 of spaced-apart grooves 2. All the grooves 70 have inner and outer edges 3; 7 defining wedges formed as right conical frustums 4 in an alternating arrangement. In one embodiment of the present invention, the distance 8 from the longitudinal axis of symmetry "a" of the clamp support body to the greatest depth of the second series of grooves 60, each of which has a depth 5', is shown in the side view and is not less than 0.125 inch. The configuration of grooves shown in FIGS. 1E and 1F allows for the clamping of multiple sized tubes in the same row and side by side. The first series of grooves 6 have circular bases 22. The second series of grooves 60 have bases 220 which are arcuate in the direction of the longitudinal axis "a", as in FIGS. 1E, 2A and 2B, for example.

FIG. 1G illustrates two clamp support bodies 1 with cylindrical shape having molded shape surfaces 1 held together by assembly hardware, generally at 12, such as bolts 50 and nuts 52, and clamping a single tube 13 as part of a clamp assembly.

FIG. 1H illustrates two clamp support bodies of right circular cylindrical shape $1^1$ held together by assembly hardware, generally at 12, and consisting of bolts 50 and nuts 52, and clamping multiple tubes 13 of equal diameter.

FIG. 1I illustrates three clamp support bodies of right circular cylindrical shape 111 held together by assembly hardware, generally at 12, such as bolts 50 and nuts 52, and clamping multiple series of tubing 13 of unequal diameter in a same row and in a rectangular array as part of a clamp assembly or clamp system.

FIG. 2A illustrates the embodiment of the present invention shown in FIG. 1E in which the greatest width 23 of each groove, measured from its outer edges 3 connecting to the surface 14 with the greatest circumference of the clamp, is not less than 0.177 inch. Proportionate spacing 25 between grooves 2 forms a tightly spaced arrangement that allows for the tubing 13 to be arranged as compact as possible while providing adequate spacing for ventilation between each tube.

Figure 2B:
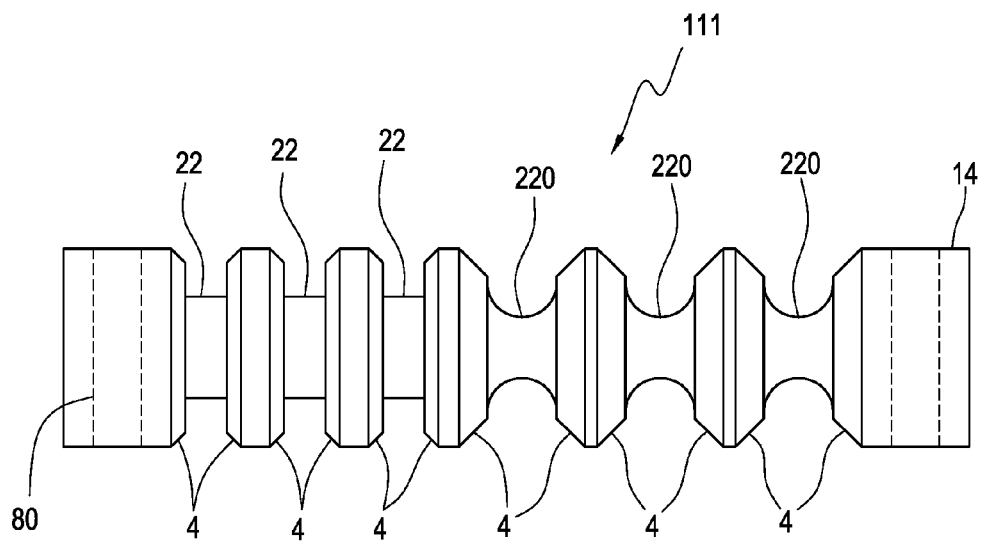

FIG. 2B illustrates a clamp support body 111 of right circular cylindrical shape showing the grooves 2 having circular groove bases 22 which are even and parallel with the axis of symmetry "a" and which are circular in a cross section. The circular groove bases 22 of the grooves 2 provide more space between tubing and clamp surface as well as a stronger base design when required. In FIG. 2B, the grooves 2 have spaced outer and inner edges 3; 7 which define right conical frustums 4 each having a cone angle which may range from 45 degrees to 85 degrees, for example, to accommodate multiple diameters of tubing. The groove bases 220, which are shown at the right of FIGS. 1E, 2A and 2B, for example are arcuate in the direction of the longitudinal axis "a".

FIGS. 3A and 3B illustrate a clamp support body of right circular cylindrical shape 40 bisymmetrically segmented by a single plane 17 oriented in line with the cylinder's longitudinal axis of symmetry "a" creating a quadrilateral base support surface 24 with one symmetrical groove 2 having spaced outer and inner edges 3; 7 forming two right conical frustum sections 4.

FIGS. 3C and 3D illustrate a clamp support body of right circular cylindrical shape 42 segmented by a single plane 17 oriented parallel but offset from the cylinder's longitudinal axis of symmetry "a" to form a series of base support surfaces 26. The plane 17 in FIG. 3C segments the clamp into unequal halves unlike the segmentation of the clamp in FIG. 3A and leaves the circular base surface 22 of the circular groove 2 with the circumference 20 as circular. The clamp is more rigid as a result.

In each of the clamp support bodies shown in FIGS. 3A-3D, the cylindrical segment shape of the clamp enables a more compact clamping system. The circumferential length of the grooves' outer edges 3 and the clamps' greatest circumference 14 are equal. The outer edge 3 of the right conical frustum section 4 has a circumference which is equal to the clamp surface area 14 having the greatest circumference of the clamp 6.

FIG. 3E illustrates a stack of clamp support bodies of right circular cylindrical shape with the top and bottom support bodies being segmented by a single plane which is oriented parallel to the cylinder's axis of symmetry, as shown in FIGS. 3A-3C, and the middle clamp support body being un-segmented as, for example, shown in FIGS. 2A-2B. The three clamp support bodies arrange the tubing 13 in a rectangular array with assembly hardware, generally at 12, bringing them together. The number of tubes 13 clamped in a rectangular array of tubing can be increased by adding one or more clamps on the top or bottom or by increasing the length of the clamp bodies and the number of grooves 1 in those clamp bodies.

Optionally, also shown in FIG. 3E are top and bottom backing plates 21 engaged by the fasteners, generally at 12, and providing for added support. Optionally, a middle clamp support body may comprise two of the segmented clamp support bodies each, such as the segmented clamp support body 40 shown in FIG. 3C, disposed back to back and having a single backing plate 22 therebetween.

FIG. 3F illustrates two clamp support bodies of right circular cylindrical shape 1 and each segmented by a single plane oriented parallel to the cylinder's longitudinal axis of symmetry "a", as depicted in FIG. 3A, and clamping a single tube 13, using the assembly hardware, generally at 12.

FIG. 3G illustrates a side view of a clamp according to another embodiment of the invention in which an upper clamp support body 30 without any grooves and a lower clamp support body 40 segmented by a single plane and having a groove 12, as shown in the embodiment of FIG. 3A, support a tube 13 clamped therebetween. The upper clamp support body 30, without grooves, is a cylindrical rod. The upper backing plate 21 and the lower clamp support body 40 are secured by fasteners, generally at 12. In this way, a three point support system is provided for supporting the tubing, i.e. using a clamp support body 40 having grooves providing two support points and an upper cylindrical support body 30 providing a third support point.

The tubing clamp assemblies of FIGS. 1G, 1H, 1I and 3E can also be modified to include an upper or lower cylindrical clamp support body 30 without grooves in place of a clamp support body having grooves, in order to provide the three point contact support shown in FIG. 3G, with or without the additional support plate(s) 21 as shown in FIG. 3E. Further, for applications in which there are different sized tubing 13 being accommodated in the three point support configuration, the depth of the grooves 2 may be adjusted on the grooved clamp support body to ensure that the top surface of each of the different OD tubes 13 engages the upper clamp body in a straight line, substantially parallel to the longitudinal axis of symmetry "a". Alternatively, the upper clamp support body may have a step profile where the stepped part accommodates the tubes 13 having a different OD when tubes 13 of different diameters are accommodated together in a row of a three point clamp configuration.

According to embodiments of the invention, the clamp support bodies are manufactured from metal or plastic cylindrical rods, for example of stainless steel, aluminum or synthetic resin, such as DELRIN™. Teflon or Teflon coatings are also suitable in the manufacture. Using a synthetic resin for the clamp support body prevents dissimilar material problems from arising. However, using a material for the clamp support body which matches that of the tubing also prevents dissimilar material problems from arising. In some embodiments, the clamp support bodies and the backing plates 21 are manufactured and the holes 80 for accommodating the fasteners, generally at 12, are drilled in the bodies during assembly of the clamp support bodies. The holes 80 may also be pre-drilled at the time of manufacture of the clamp support bodies.

What is claimed is:

1. A clamp for supporting and securing tubing in a clamping system, said clamp comprising:
   a clamp body having a cylindrical shape with an outer circumferential surface and having a longitudinal axis;
   at least a first groove in said clamp body, said at least first groove being formed intermediate first and second ends of said clamp body and having a groove base spaced at a groove depth from said outer circumferential surface, said at least first groove having first and second radially extending, longitudinally spaced groove walls, each of said groove walls being perpendicular to the longitudinal axis and terminating at longitudinally spaced groove inner and outer edges, said longitudinally spaced inner and outer edges of each of said radially extending groove walls forming one of first and second spaced right conical frustum sections, said first and second spaced right conical frustum section each formed by said spaced outer and inner edges of each of said radially extending groove walls having a frustum section width less than said groove depth and each being spaced from said groove base, each of said first and second right conical frustum sections forming a tube surface engaging support area for engagement with a tube supported by said right conical frustum sections defined by said inner and outer groove edges of said clamp body and spaced from said groove base; and
   a fastener receiving hole in at least one of said first and second ends of said clamp body and extending perpendicularly to said longitudinal axis.

2. The clamp of claim 1, wherein the first and second spaced right conical frustum sections of said at least first groove each form a minimum tube surface engaging support area for engagement with a tube.

3. The clamp of claim 1 further including a plurality of said grooves and wherein at least a first one of said plurality of grooves has a first groove width and wherein at least a second one of said plurality of grooves has a second groove width different from said first groove width.

4. The clamp of claim 1 wherein said groove base is planar in a direction of said longitudinal axis.

5. The clamp of claim 1 wherein said groove base is arcuate in a direction of said longitudinal axis.

6. The clamp of claim 1 further including one of said fastener receiving holes at each of said first and second ends of said clamp body.

\* \* \* \* \*